United States Patent [19]
Hyodo et al.

[11] Patent Number: 5,608,719
[45] Date of Patent: Mar. 4, 1997

[54] ATM MULTIPLEX TRANSMISSION SYSTEM HAVING TEST EQUIPMENT

[75] Inventors: Ryuji Hyodo; Susumu Eda; Katsumi Oomuro; Osamu Sekihata; Kenji Tanaka; Hiroyuki Hatta; Reiko Norizuki, all of Kawasaki, Japan

[73] Assignee: Fujitsu Limited, Kawasaki, Japan

[21] Appl. No.: 447,639

[22] Filed: May 23, 1995

Related U.S. Application Data

[63] Continuation of Ser. No. 946,902, Sep. 18, 1992, abandoned.

[30] Foreign Application Priority Data

Sep. 19, 1991 [JP] Japan .................................. 3-268229

[51] Int. Cl.⁶ .................... H04L 12/56; H04Q 1/20
[52] U.S. Cl. .................... 370/250; 370/395; 370/413
[58] Field of Search ................. 370/58.1, 58.2, 370/58.3, 60, 60.1, 94.1, 94.2, 13, 14, 16, 17; 371/20.1, 20.4, 27; 340/825.16; 375/124; 379/8–10, 15, 16, 18

[56] References Cited

U.S. PATENT DOCUMENTS

| | | | |
|---|---|---|---|
| 4,970,720 | 11/1990 | Esaki | 370/94.1 |
| 4,993,018 | 2/1991 | Hajikano et al. | 370/60 |
| 5,067,123 | 11/1991 | Hyodo et al. | 370/58.2 |
| 5,101,404 | 3/1992 | Kunimoto et al. | 370/60 |
| 5,159,591 | 10/1992 | Gohara et al. | 370/60 |
| 5,161,151 | 11/1992 | Kimura et al. | 370/13 |
| 5,214,642 | 5/1993 | Kunimoto et al. | 370/94.1 |
| 5,251,204 | 10/1993 | Izawa et al. | 370/15 |
| 5,257,311 | 10/1993 | Naito et al. | 370/94.1 |
| 5,313,453 | 5/1994 | Uchida et al. | 370/13 |

FOREIGN PATENT DOCUMENTS 1-500634  3/1989  Japan .

OTHER PUBLICATIONS

U.S. application Ser. No. 07/925,596, filed Aug. 4, 1992, Hyodo.

*Primary Examiner*—Benedict V. Safourek
*Assistant Examiner*—Chau T. Nguyen
*Attorney, Agent, or Firm*—Staas & Halsey

[57] ABSTRACT

An ATM multiplex transmission system including an ATM adaptation layer (AAL) processing unit, an ATM cross connection processing unit having a switch and FIFO memories connected to the incoming and outgoing sides, and dummy load cell generating units which forcibly write dummy load cells in the incoming FIFO memories or outgoing FIFO memories, the writing of the dummy load cells being used to execute a load test on the FIFO memories.

18 Claims, 18 Drawing Sheets

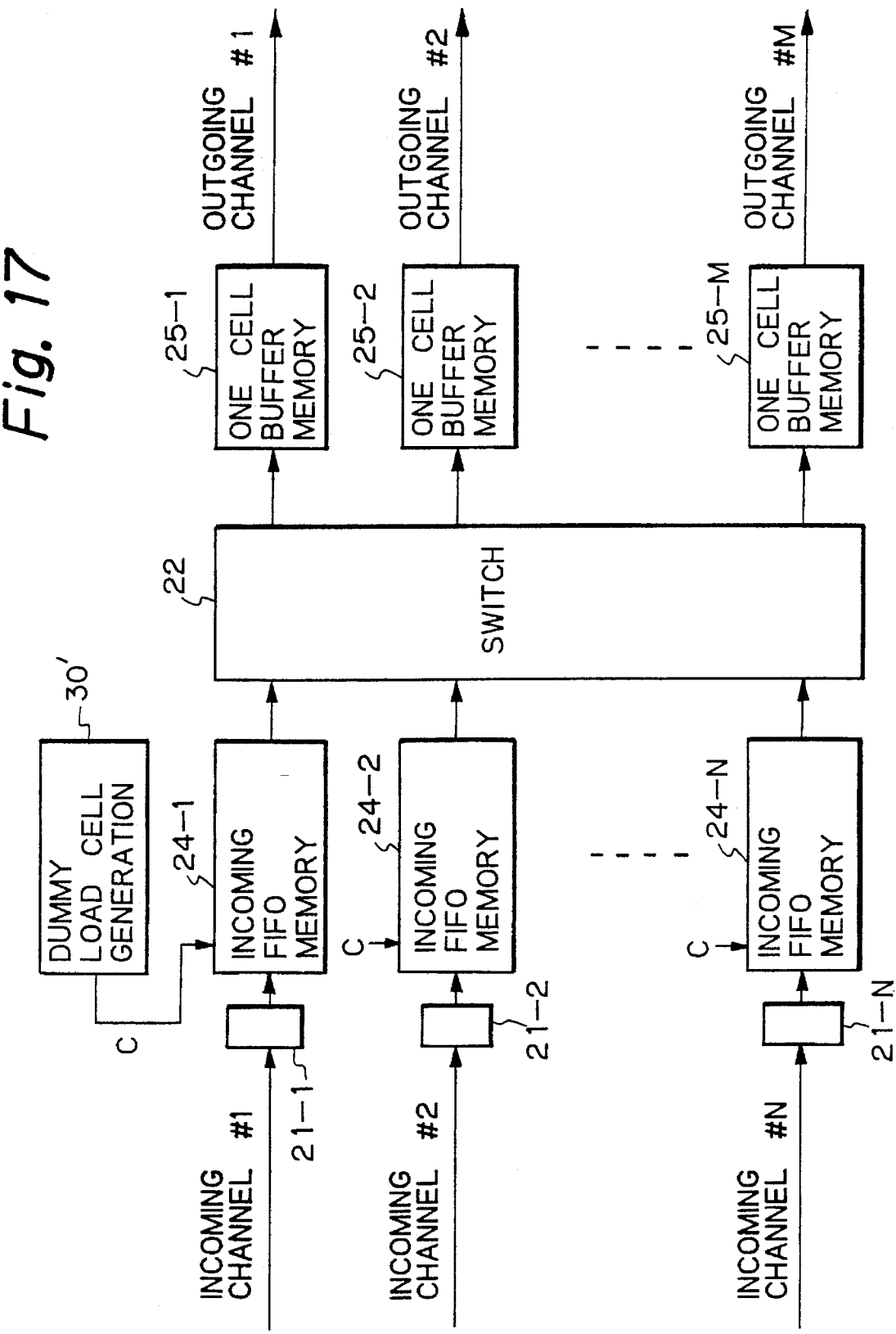

5,608,719

ATM MULTIPLEX TRANSMISSION SYSTEM HAVING TEST EQUIPMENT

This application is a continuation, of application Ser. No. 07/946,902, filed Sep. 18, 1992, now abandoned.

BACKGROUND OF THE INVENTION

1. Field of the Invention

The present invention relates to an asynchronous transfer mode (ATM) multiplex transmission system having test equipment which performs load tests etc. on the incoming or outgoing first-in first-out (FIFO) memories used for an ATM cross connection processing unit.

In recent years, attention has focused on ATM type telecommunications equipment, which divides a series of information into cells of any finite length and transmits these cells so as to make more efficient use of telecommunication channels. The ATM system is a new technology and therefore there are currently no established tests for the load of the FIFO memories used for the ATM cross connection processing units. Various methods are being proposed at this stage.

2. Description of the Related Art

As explained later in detail, various types of ATM multiplex transmission apparatuses have already been proposed, but in all of these types of ATM multiplex transmission apparatuses, provision is made, as an external apparatus, of a load feeding apparatus which generates test use dummy cells for load tests simulating overload states, constant load states, etc. of the incoming or outgoing FIFO memories of the ATM cross connection processing unit. These dummy cells generated by the load feeding apparatus (for example, dummy cells which concentrate at a particular outgoing channel) are fed to the ATM multiplex transmission apparatus for testing the same. Here, the above-mentioned external apparatus means an apparatus which is outside of the ATM multiplex transmission apparatus and, for example, is an apparatus provided near the subscriber's terminal equipment.

There was the following problem, however, in a test of an ATM cross connection processing unit using the above-mentioned conventional load test equipment.

When the amount of processing of an ATM multiplex transmission apparatus is large (for example, when the capacity of the incoming or outgoing FIFO memories is large), it is necessary to input large amounts of dummy cells from the incoming channel of an adaptation ATM layer (AAL) processing unit to perform the above-mentioned test. Therefore, since the processing capacity of the AAL processing unit (capacity of amount of cells which can be received) is limited, it is not enough to input dummy cells from just a single line, that is, it is necessary to prepare a large number of load feeding apparatuses and input dummy cells from a large number of incoming lines. As a result, a large test environment was required.

Further, in the transitional period before the spread of ATM systems, the chances are high that load characteristic dedicated measuring apparatuses will not be available, so some sort of suitable measurement method must be proposed until they become available.

SUMMARY OF THE INVENTION

Therefore, the object of the present invention is to provide an ATM multiplex transmission system having test equipment for performing load tests and other ATM tests in an ATM cross connection processing unit wherein the test equipment can be realized compactly even when inputting large amounts of dummy cells.

Therefore, another object is to provide a suitable method of measurement of the load characteristics in the transitional period before the spread of ATM systems.

To attain the above object, the present invention is characterized by introducing into the ATM cross connection processing unit dummy load cell generating means which forcibly write dummy load cells in the incoming FIFO memories or outgoing FIFO memories.

BRIEF DESCRIPTION OF THE DRAWINGS

The above object and features of the present invention will be more apparent from the following description of the preferred embodiments with reference to the accompanying drawings, wherein:

FIG. 17 is a view of a third embodiment based on the present invention.

DESCRIPTION OF THE PREFERRED EMBODIMENTS

Before describing the embodiments of the present invention, the prior art and the problems therein will be first described with reference to the related figures.

Figure 1:
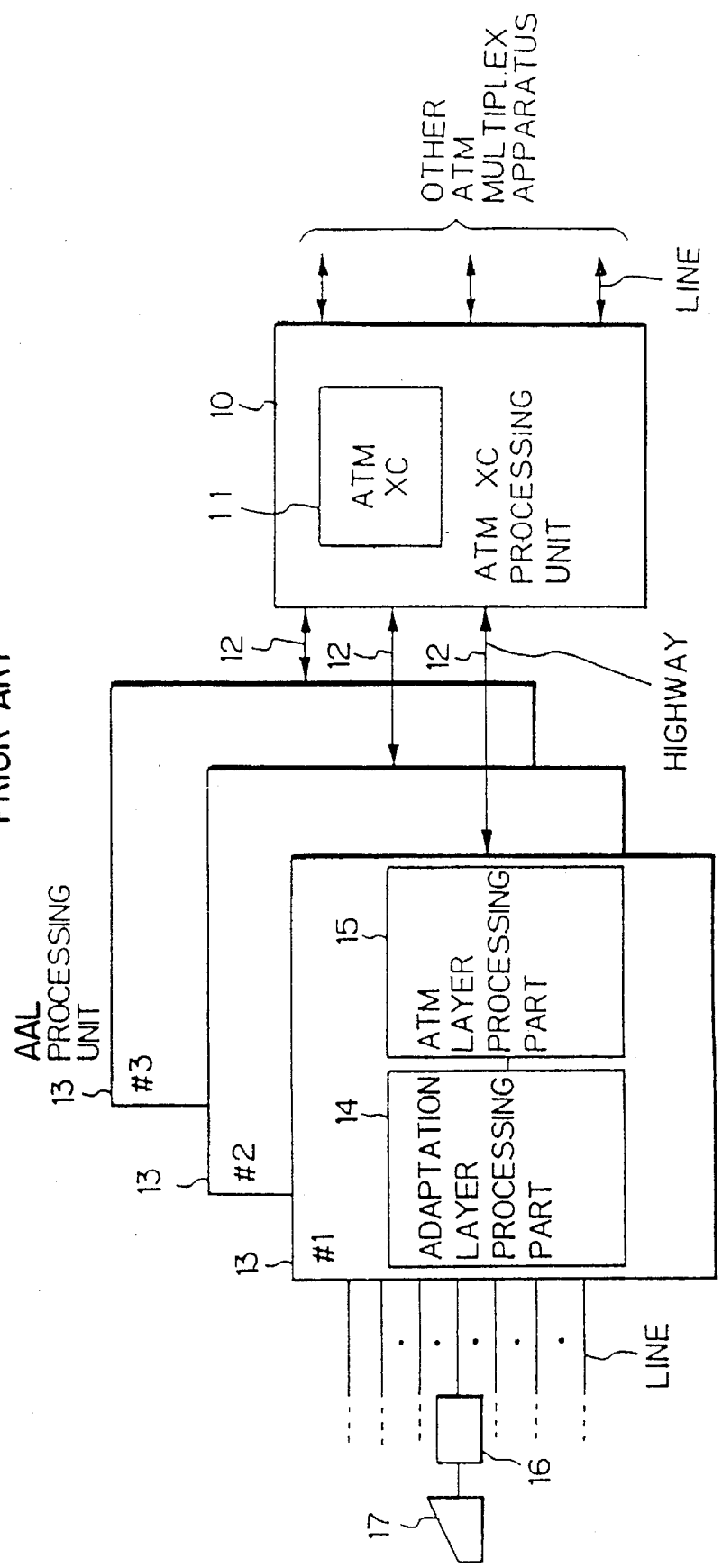
FIG. 1 is a view of a known ATM multiplex transmission system.
Figure 2A:
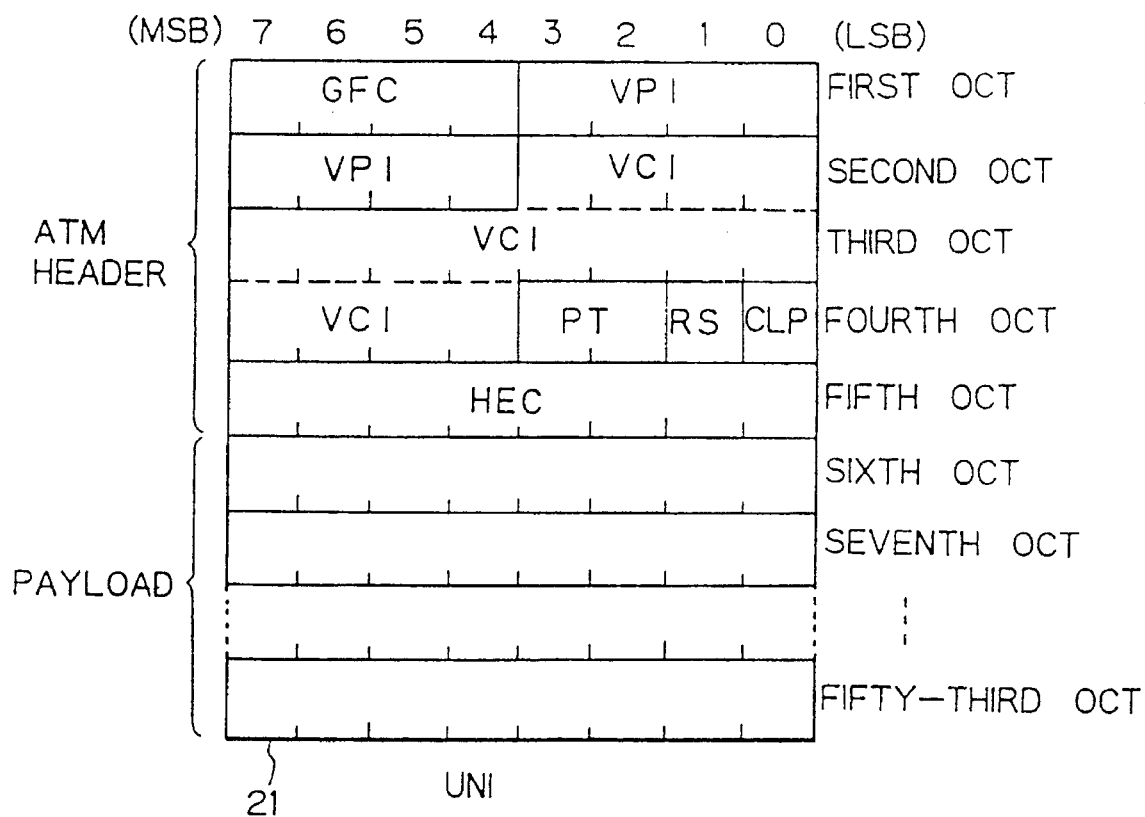
FIG. 2A is a view of an ATM cell format for a user-network interface (UNI) recommended by the CCITT.

FIG. 1 is a view of a known ATM multiplex transmission system. FIG. 2A is a view of an ATM cell format for a UNI recommended by the CCITT, and FIG. 2B is a view of an ATM cell format for an NNI recommended by the CCITT.

Figure 2B:
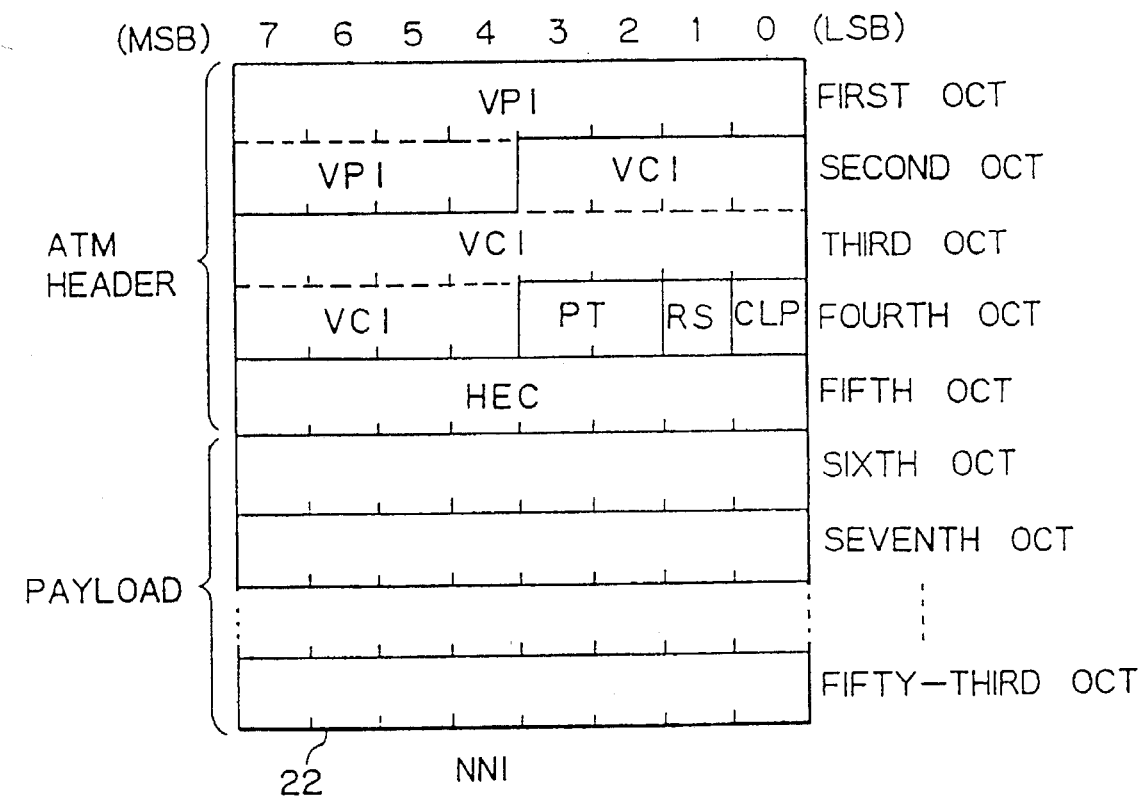
FIG. 2B is a view of an ATM cell format for a network-node interface (NNI) recommended by the CCITT.

The formats of FIG. 2A and FIG. 2B are the same in all portions except for the point that the 4 bits (7 to 4 bit positions) of the start of the first octet (8 bits indicated by "OCT") are for generic flow control (GFC) in the case of a UNI and are for a virtual path identifier (VPI) in the case of an NNI.

That is, the 4 bits of the latter half (3 to 0 bit positions) of the first octet and the 4 bits of the start of the second octet form the VPI. After this, a virtual channel identifier (VCI) is provided up to the 4 bits of the first half of the fourth octet. The pilot type (PT), reserve bit (RS), and the cell loss priority (CLP) will follow. The fifth octet is provided with header error control information (HEC). The ATM header is comprised by the first to fifth octets. The 48 octets from the succeeding sixth octet to the 53rd octet constitute the payload.

In FIG. 1, reference numeral 13 shows adaptation ATM layer (AAL) processing units which each include an adaptation (ADP) layer processing part 14 having the function of terminating the protocol with the terminal equipment 17 and assembling (constructing cell units) and disassembling (restoring cells into original data) cells of an adaptation layer, and also an ATM layer processing part 15 which is provided with the function of adding headers to the cells from the adaptation layer processing part 14 or receiving cells from an ATM cross connection (indicated by ATM-XC) processing unit 10 and removing the headers from the same. Reference numerals 12 show highways (actually two each being provided for the upstream and downstream directions) connecting the AAL processing units 13 and the next ATM cross connection processing unit 10. The ATM cross connection processing unit 10 includes an ATM cross connection 11.

The AAL processing units 13 each accommodate lines connecting the AAL processing units 13 to a plurality of terminal equipment 17. Digital signals from the lines and in an upstream direction (direction heading from terminal equipment to ATM multiplex transmission system) are separated into units of predetermined lengths of digital data at the adaptation layer processing parts 14 of the AAL processing units 13 and used as data fields. Adaptation headers (for example, 3 bytes) are added to assemble 48 byte cells (pilot portions).

The cells output from the adaptation layer processing parts 14 have headers (5 bytes) added to them at the next ATM layer processing parts 15 to prepare ATM cells (total 53 bytes) which are multiplexed and output to the highways 12. The ATM cross connection processing unit 10 distributes the cells multiplexed on the highways connected with the AAL processing units 13 to lines heading to the destinations corresponding to the VPI/VCI's. A plurality of cells are multiplexed (time compressed) on the lines.

The ATM cross connection processing unit 10 performs the processing for the downstream direction signals as well, outputs the ATM cells input from the lines to the downstream highways 12, and inputs them to the AAL processing units 13 processing the downstream signals. The ATM layer processing parts 15 in the processing units 13 discriminate the headers of the cells and remove the headers from them. At the next adaptation layer processing parts 14, the cells are disassembled and the original digital signals are restored.

In FIG. 1, the block 16 is particularly relevant to the present invention. This shows the previously mentioned external load feeding apparatus (however, shows only one). When using a conventional ATM test using this load feeding apparatus 16, the problem mentioned above occurs in the ATM multiplex transmission system and therefore this is not desirable. The present invention proposes therefore an ATM multiplex transmission system which contains test equipment as explained below. The test equipment of the present invention acts directly on the ATM cross connection (XC) 11 shown in FIG. 1. In this case, the test equipment may also be applied to any known type of ATM cross connection 11.

Figure 3:
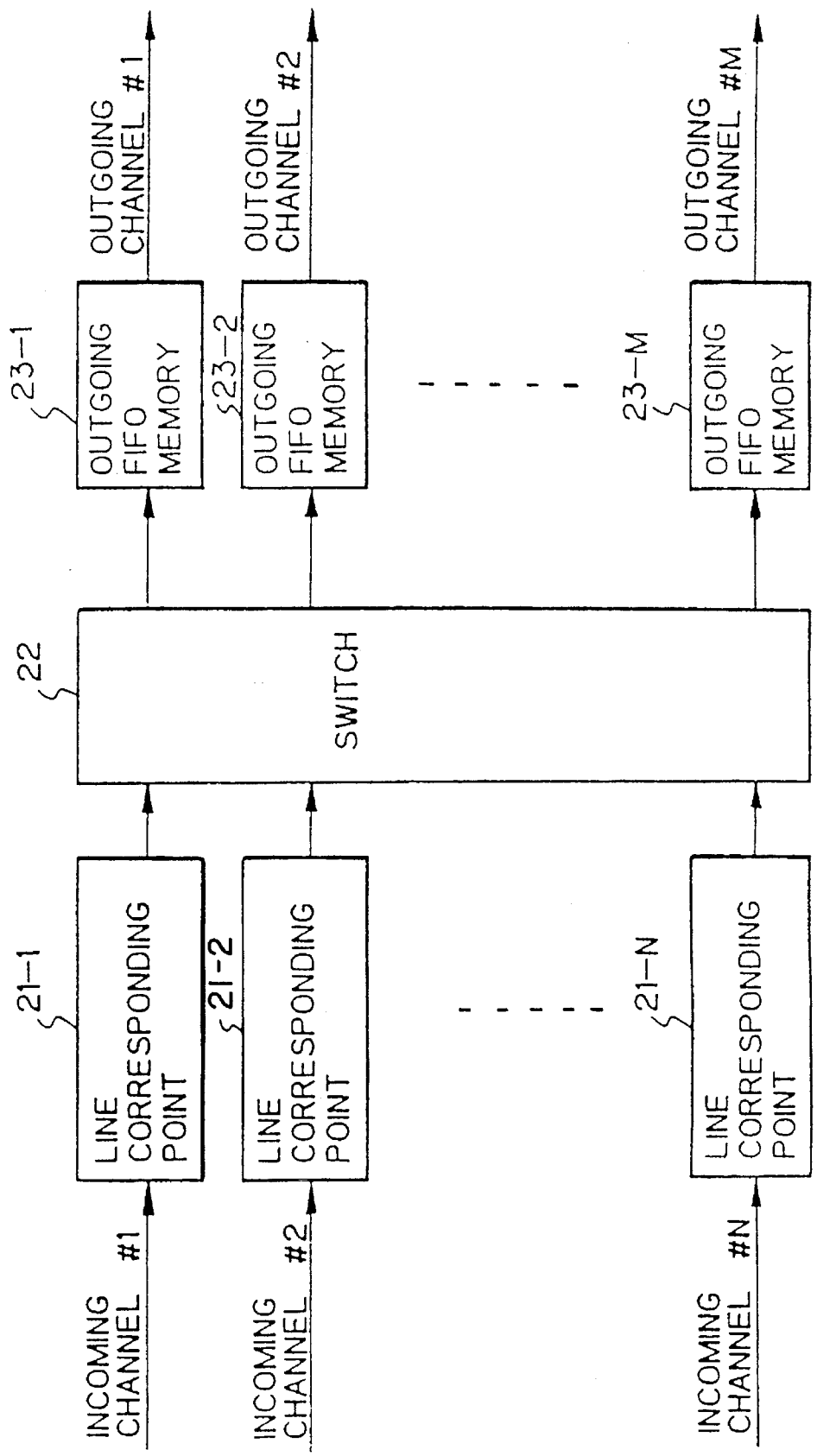
FIG. 3 is a view of a known first type of ATM cross connection.
Figure 4:
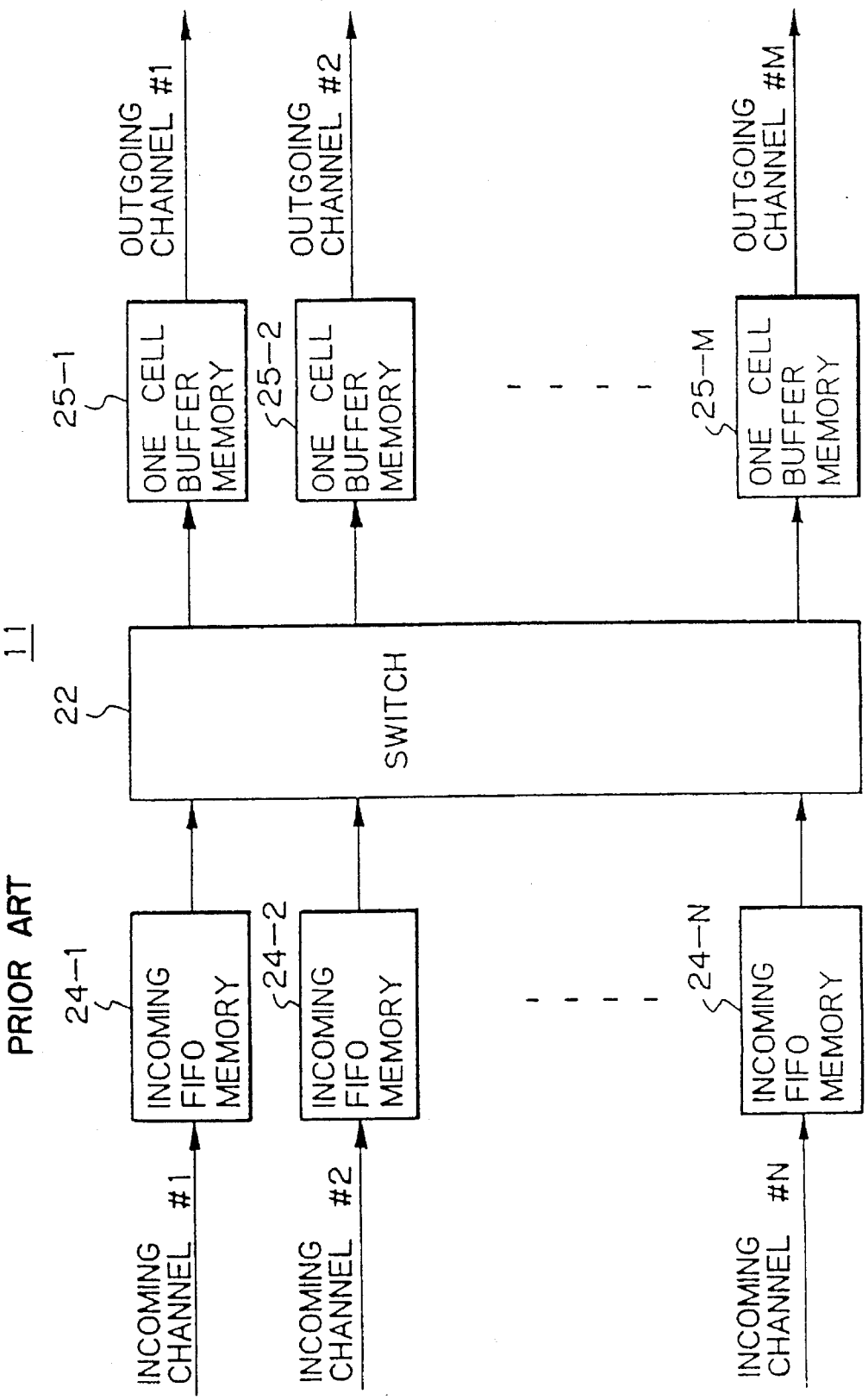
FIG. 4 is a view of a known second type of ATM cross connection.

FIG. 3 is a view of a known first type of ATM cross connection; FIG. 4 is a view of a known second type of ATM cross connection; and FIG. 5 is a view of a known third type of ATM cross connection.

FIG. 3 shows an example of the constitution of a conventional ATM cross connection 11 of an outgoing FIFO type. In the figure, 21-1 to 21-N are line corresponding points provided corresponding to the incoming channels #1 to #N. These perform processing to remove the empty cells in the channels and input only the significant cells to the later switch 22. Reference numeral 22 shows this switch, which functions to switch cells input from the incoming channels to the desired outgoing channels. Reference numerals 23-1 to 23-M are outgoing FIFO memories which, for example, have memory lengths of about 100 cells and perform buffering for cells during congestion etc.

FIG. 4 illustrates an example of the constitution of a conventional ATM cross connection of the incoming FIFO type. In the figure, reference numerals 24-1 to 24-N are incoming FIFO memories provided corresponding to the incoming channels #1 to #N. These have memory lengths of about 100 cells and perform buffering of cells during times of congestion etc. Reference numeral 22 is the switch, while 25-1 to 25-M are one cell buffer memories for adjusting the timing, provided corresponding to the outgoing channels #1 to #M.

Figure 5:
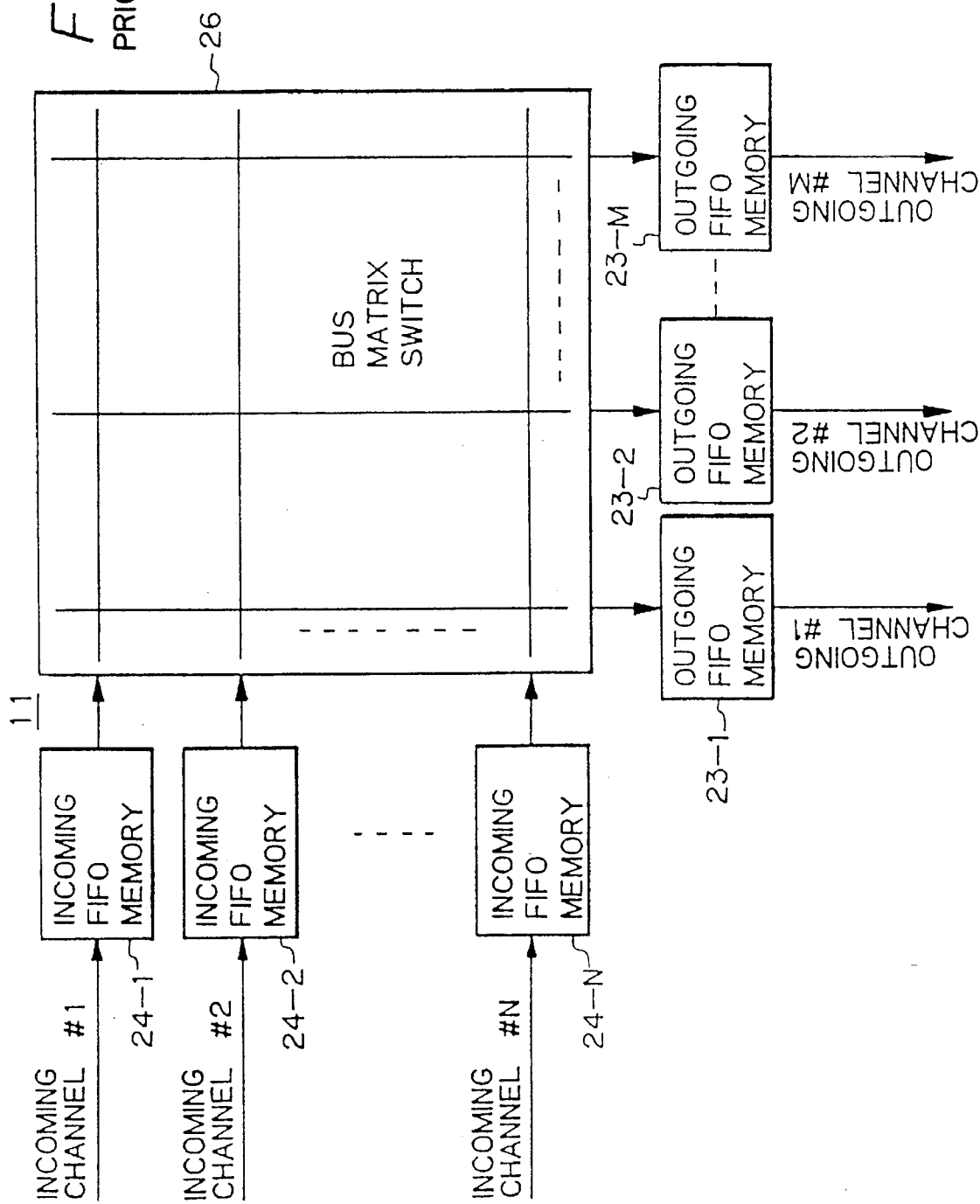
FIG. 5 is a view of a known third type of ATM cross connection.

FIG. 5 shows an example of the constitution of a conventional ATM cross connection 11 of the matrix type. In the figure, 24-1 to 24-N are incoming FIFO memories provided corresponding to the incoming channels #1 to #N, 26 is a bus matrix switch, and 23-1 to 23-M are outgoing FIFO memories provided corresponding to the outgoing channels #1 to #M.

Figure 6:
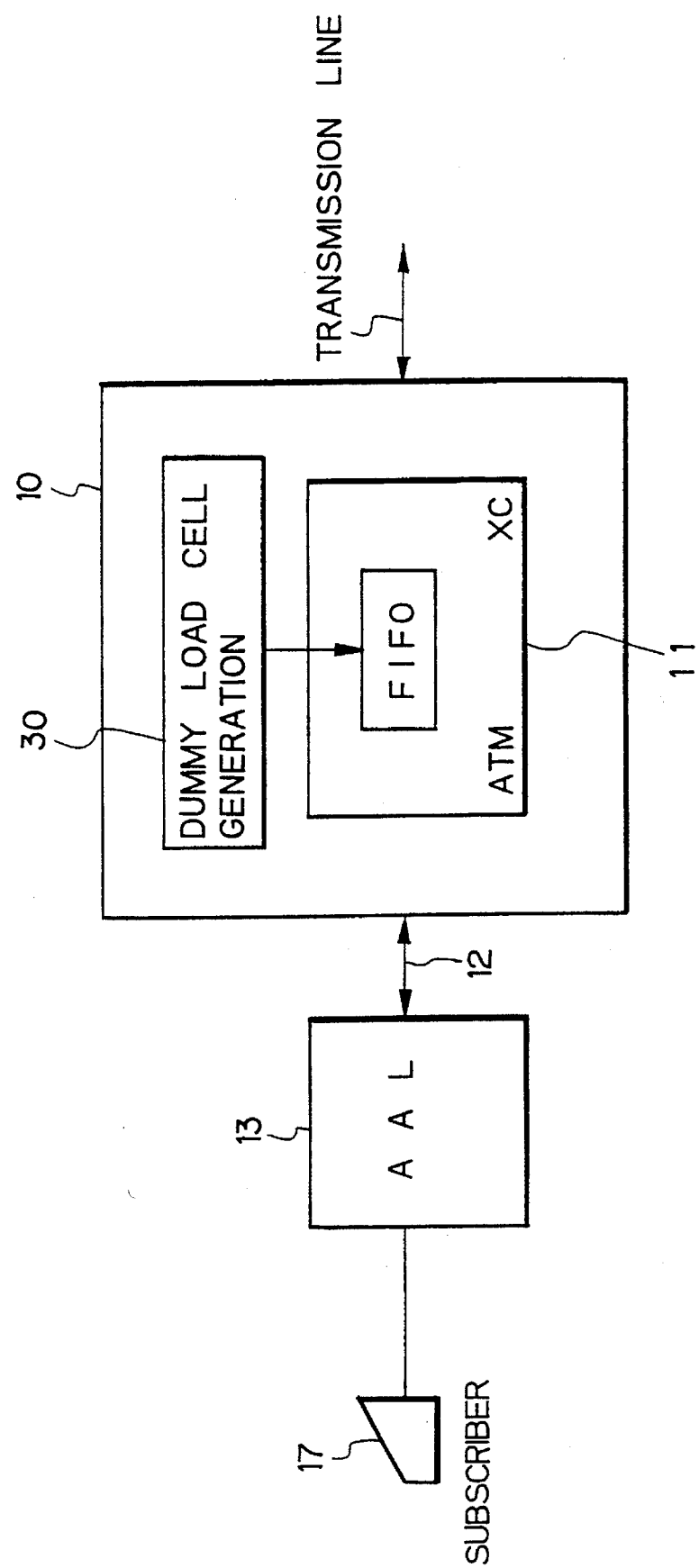
FIG. 6 is a block diagram of the basic constitution of an ATM multiplex transmission system according to the present invention.

FIG. 6 is a block diagram of the basic constitution of an ATM multiplex transmission system according to the present invention. Note that throughout the figures, the same reference numerals or symbols are given to similar constituent elements. In FIG. 6, reference FIFO is the general label for the incoming FIFO memories or outgoing FIFO memories shown in FIG. 4 and FIG. 5. The present invention is characterized in that dummy load cell generating means 30 are introduced into the ATM cross connection processing unit for writing dummy load cells in the FIFO memories. That is, the ATM multiplex transmission system having test equipment according to the present invention comprises:

(i) an ATM adaptation layer (AAL) processing unit 13 which terminates the protocol with a terminal equipment 17, assembles the data to be transmitted into ATM cells and multiplexes the same, and disassembles the multiplexed ATM cells sent to the terminal equipment 17 and distributes the same to the terminal equipment;

(ii) an ATM cross connection processing unit 10 which is provided with a switch 22 which switches multiplexed cells from the AAL processing unit 13 to designated lines or switches the multiplexed ATM cells from the lines to the AAL processing unit 13, and switches between a plurality of incoming channels and a plurality of outgoing channels. The incoming FIFO memories or outgoing FIFO memories are respectively provided at the incoming or outgoing sides of the switch 22; and (iii) dummy load cell generating means 30 which forcibly writes dummy load cells in the incoming FIFO memories or outgoing FIFO memories 23 in the ATM cross connection processing unit 10.

Figure 7:
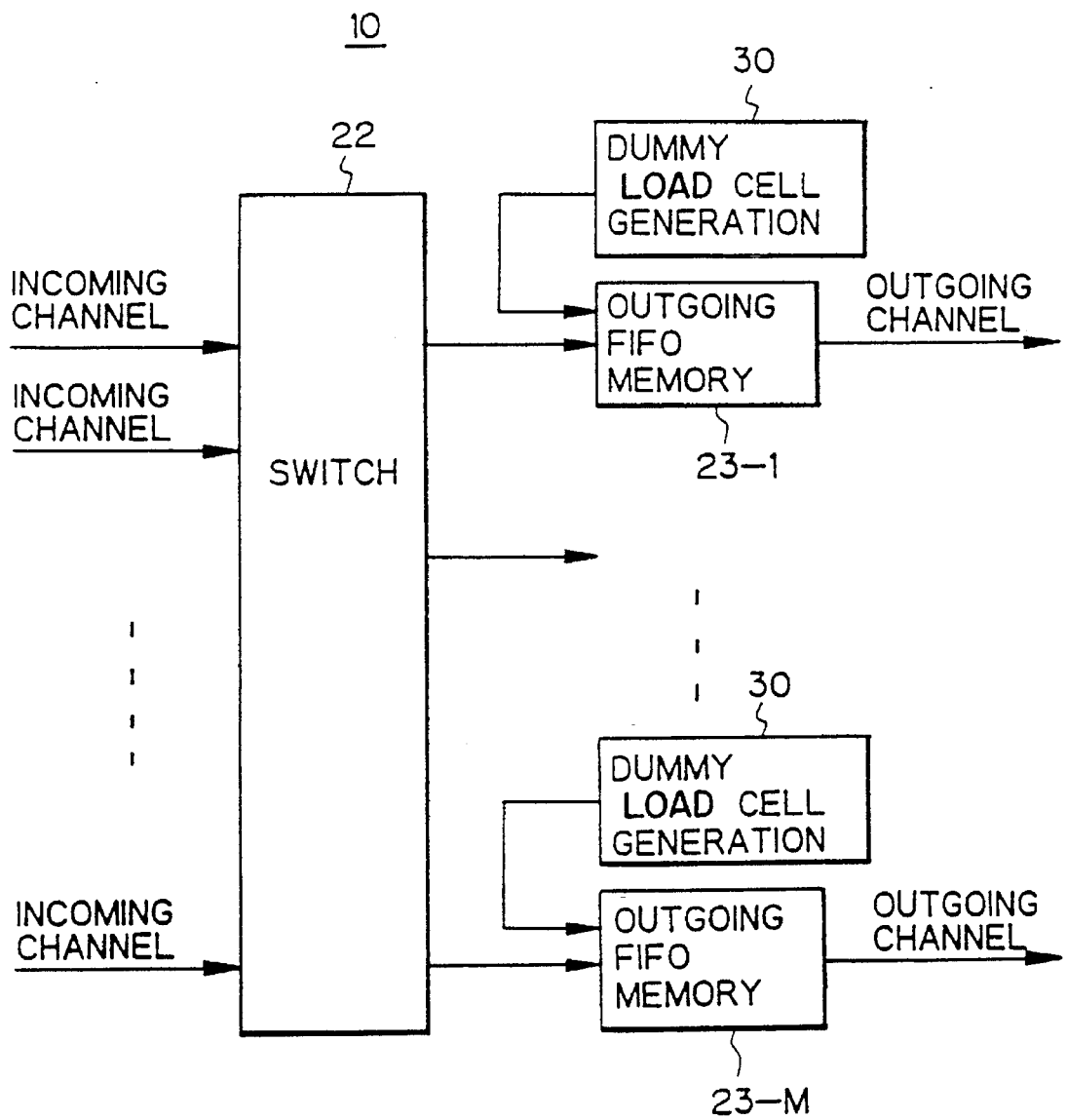
FIG. 7 is a view of a first embodiment based on the present invention.

FIG. 7 is a view of a first embodiment based on the present invention. This first embodiment is based on the above-mentioned known first type of ATM cross connection (see FIG. 3). That is, the dummy load cell generating means 30 are provided corresponding to the outgoing FIFO memories 23-1 to 23-M and the outputs of the dummy load cell generating means 30 are connected to the inputs of the outgoing FIFO memories 23-1 to 23-M. In this way, a load test on the FIFO memories is performed by providing the dummy load cell generating means 30 and writing dummy load cells into the FIFO memories (23) being tested by the means 30 at the time of the ATM testing.

For the dummy load cells, use may be made of empty cells inserted as timefills between significant cells sent to the outgoing channels.

Figure 8:
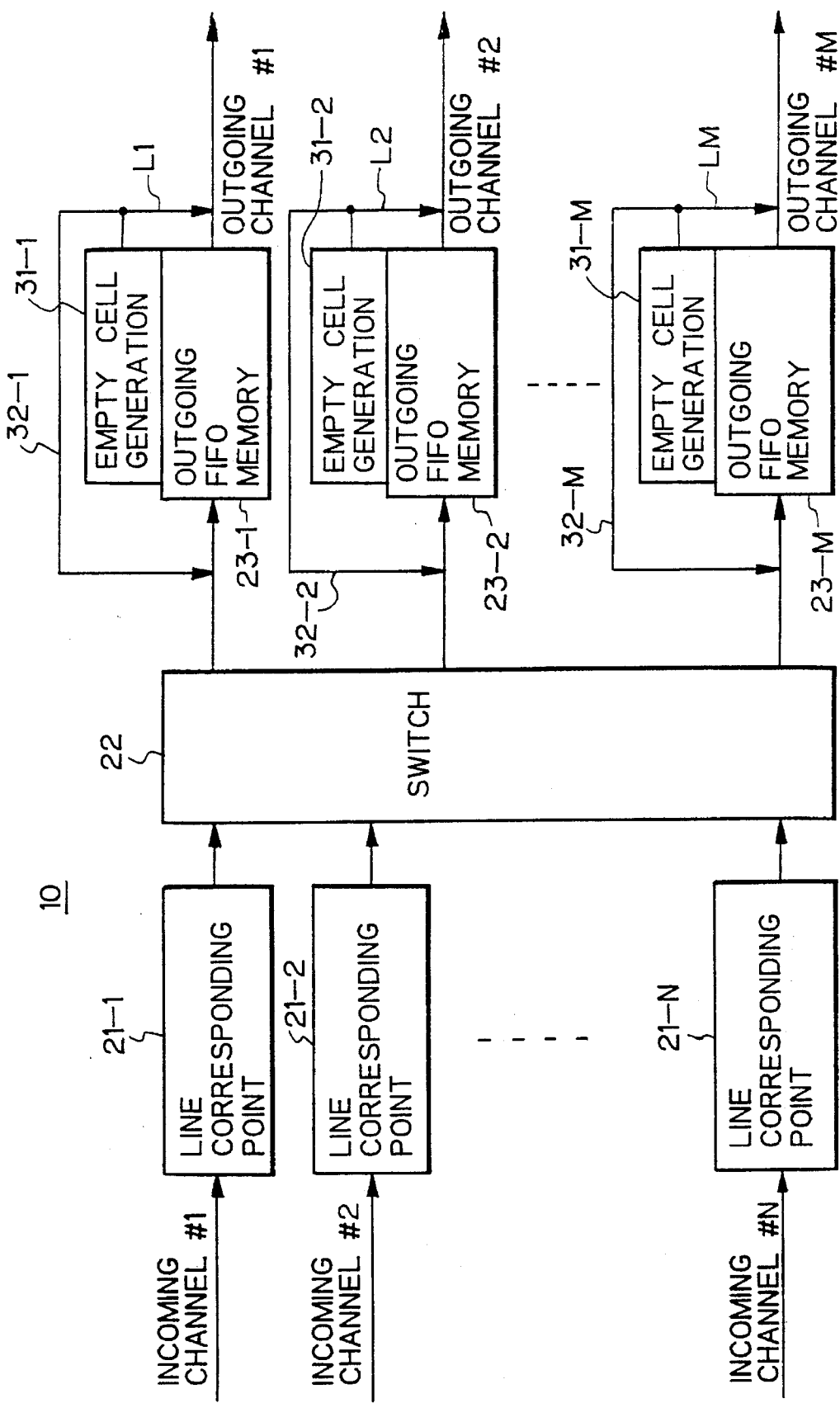
FIG. 8 is a view of a specific example of the first embodiment shown in FIG. 7.

FIG. 8 is a view of a specific example of the first embodiment shown in FIG. 7. The means 30 are realized using the above-mentioned empty cells. In the figure, 21-1 to 21-N are line corresponding points provided corresponding to the incoming channels #1 to #N, 22 is a switch, and 23-1 to 23-M are outgoing FIFO memories provided corresponding to the outgoing channels #1 to #M. This is the same as was explained with reference to the prior art.

The outgoing FIFO memories 23-1 to 23-M are provided with the function of sending out empty cells instead of significant cells when there are no significant cells (significant information) to be sent out on the outgoing channels. This is also the same as in the prior art. The outgoing FIFO memories 23-1 to 23-M are provided with empty cell generating units 31-1 to 31-M for generating empty cells for this purpose. Ordinarily, the empty cells are sent out on the outgoing channels through the lines L1 to LM.

The dummy load cell generating means 30 of the present invention are comprised of empty cell generating units 31-1 to 31-M provided originally for the outgoing FIFO memories and feedback loops 32-1 to 32-M which return the empty cells from the empty cell generating units 31-1 to 31-M to the inputs of the outgoing FIFO memories (23). That is, this embodiment of the present invention is provided with a function whereby when necessary in load tests etc., the empty cells generated by the empty cell generating units 31-1 to 31-M are returned to the input sides of the outgoing FIFO memories 23-1 to 23-M to be input to the corresponding outgoing FIFO memories.

Figure 9:
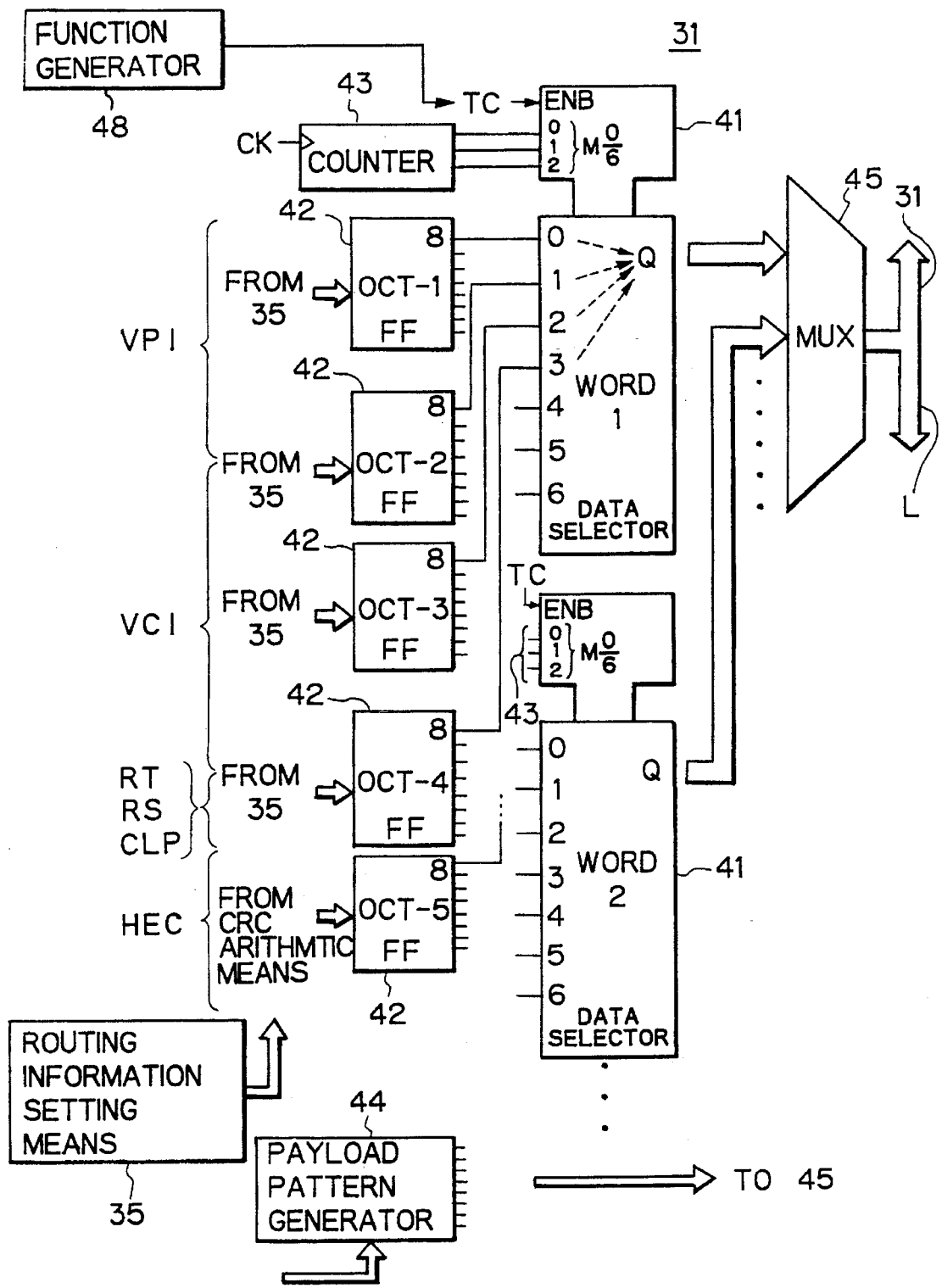
FIG. 9 is a view of a detailed example of the known empty cell generating unit shown in FIG. 8.

FIG. 9 is a view of a detailed example of the known empty cell generating unit shown in FIG. 8. In the figure, the empty cell generating unit 31 is comprised of flip-flops 42 corresponding to a plurality of octets comprising the ATM header part of the ATM cells; data registers 41 which select the bits of the octets and output word data; a counter 43 which selects the bit data in the data selectors 41 in the order of the octets; a payload pattern generator 44 which generates any data pattern to be written in the pilots of the ATM cells; and a multiplexer 45 which combines the outputs from the data selectors 41 and the output from the payload pattern generator 44. Here, each of the flip-flops 42 is set with information from the routing information setting means 35, that is, ATM header information.

Next, an explanation will be made of the operation in the apparatus of FIG. 8 (during ATM tests).

Figure 10:
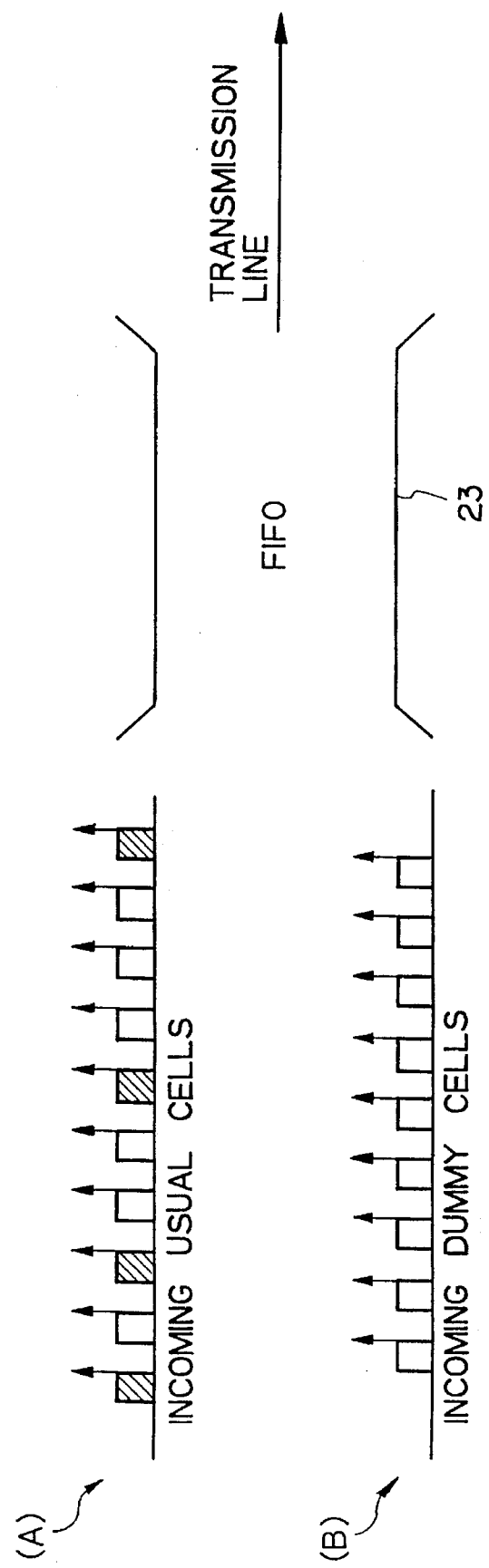
FIG. 10 is a view for explaining the general load feeding test.
Figure 11:
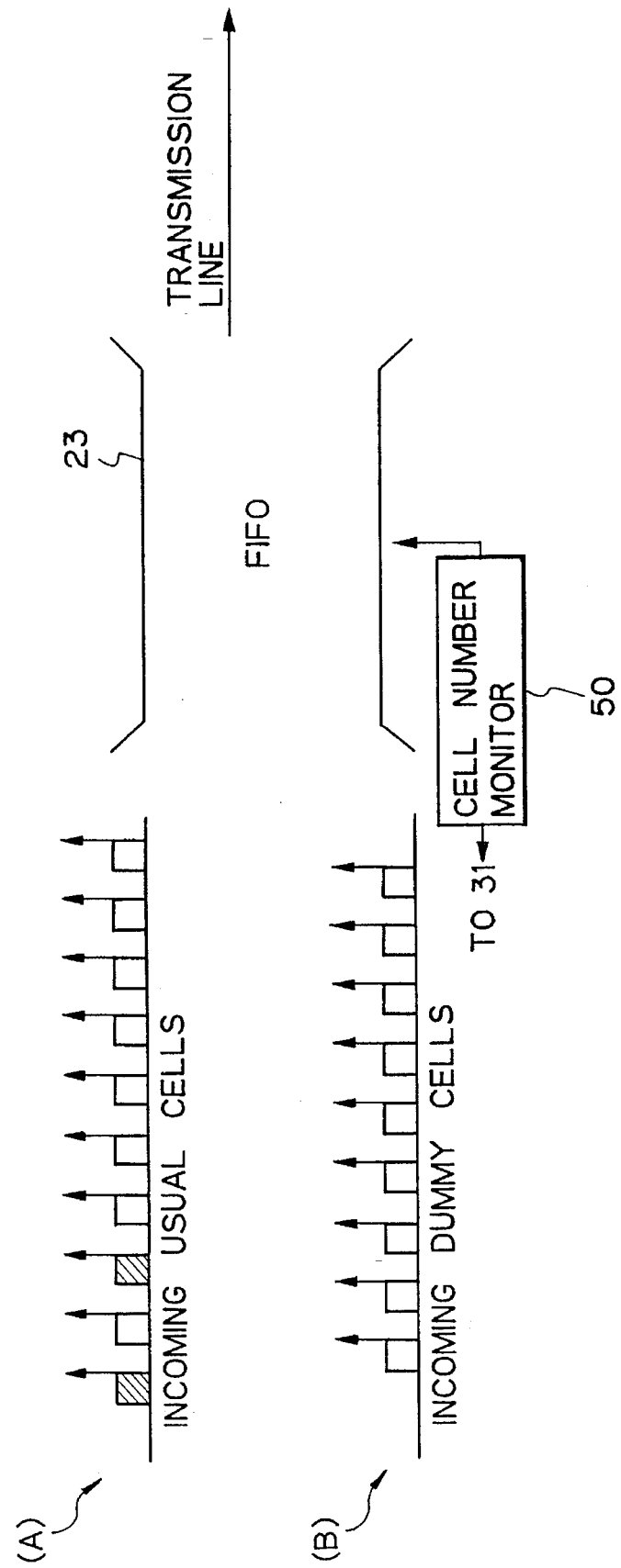
FIG. 11 is a view for explaining a test for feeding a fixed amount of a load.

FIG. 10 is a view for explaining the general load feeding test; and FIG. 11 is a view for explaining a test for feeding a constant amount of a load.

First, an explanation will be made of a general load feeding test.

Before this, however, to improve understanding, an explanation will be given of general ATM transmission at ordinary times other than test periods.

As mentioned above, in ATM transmission, empty cells are inserted between significant cells as timefills for filling in the empty portions between those cells. As the method for insertion of the empty cells, in general, empty cells are not written along with significant cells in the outgoing FIFO memories 23-1 to 23-M. Rather, when the number of cells accumulated in the outgoing FIFO memories 23-1 to 23-M (number of significant cells accumulated) falls to zero, empty cells generated by the empty cell generating units 31-1 to 31-M are output on the outgoing transmission line.

For example, as shown by row (A) in FIG. 10, at normal times, significant cells (cells shown by hatching) are input at certain intervals. These significant cells are written in the outgoing FIFO memories 23 in accordance with the ordinary cell write timing. On the other hand, empty cells (cells shown by non-hatching in the figure) are not written in the outgoing FIFO memories (23). Note that the upward arrows in the figure show the timing when the cells are written in the FIFO memories.

Next, an explanation will be made of the load feeding test.

When performing a dummy load test on the outgoing FIFO memories 23, as shown by row (B) in FIG. 10, if it is necessary to feed cells at the cell write timing for the dummy load, then the empty cells generated by the empty cell generating unit 31 are fed back to the input side by the loop 32 and are written in the outgoing FIFO memories 23. This makes possible application of a dummy load and makes it possible to measure the state of discarding of cells etc. in a state of overload or a certain degree of load applied.

As the interval for generation of dummy load cells, that is, empty cells, when a load is given based on the Poisson distribution, the interval of generation may be determined using a Poisson probability function $p(\chi)$ and distribution function $P(\chi)$.

Probability function: $p(\chi)=e^{-m}\ (m^{\chi}/\chi!)$

Distribution function: $P(\chi)=\Sigma p(k)$ (where $\Sigma$ is the sum from 0 to $\chi$)

Further, it need not be a Poisson distribution. An exponential function or other (Gaussian distribution etc.) dummy load test generation probability function may also be used.

To create the above-mentioned function, a function generator is necessary. The dummy load cell generating means cooperates with this function generator and outputs cells in accordance with the generation function. Referring again to FIG. 9, the timing control signal TC input to the enable terminal (ENB) of the data selectors 41 need only be given from the function generator 48. Note that usually, the timing control signal is a signal generated at a constant period.

Next, an explanation will be made of a constant load feeding test.

In a test where a constant load is fed, the number of accumulated cells of the outgoing FIFO memories 23 is monitored by a cell number monitoring means 50 and is fed back to the empty cell generating units 31 so as to control the number of empty cells written in the outgoing FIFO memories 23 (FIG. 11). By this, more than a constant number of cells is always accumulated in the outgoing FIFO memories 23. The state of discarding of the cells etc. is thus measured. By successively changing the settings of the number of accumulated cells and studying the cell discard and other characteristics for different numbers of accumulated cells, it is possible to obtain the so-called static characteristic of the load characteristic of the ATM cross connection processing unit 10.

In the case of feeding this constant load, as shown by row (A) in FIG. 11, at normal times in the same way as in (A) of FIG. 10, if the cells are significant cells (cells with hatching), the significant cells are written in the outgoing FIFO memories 23 in accordance with the normal cell writing timing. On the other hand, if the cells are empty cells (cells shown by nonhatching in the figure), the outgoing FIFO memories 23 are not written in.

At the time of a constant load feeding test, the monitoring means 50, as shown by row (B) in FIG. 11, monitors the number of accumulated cells in the outgoing FIFO memories 23. If it is necessary to feed cells at the cell write timing each time the number of accumulated cells falls below a preset value, then empty cells are written into the outgoing FIFO memories 23 at that time. That is, when the number of accumulated cells of the outgoing FIFO memories 23 is less than a predetermined setting, the empty cell generating unit 31 is instructed to write empty cells into the outgoing FIFO memories 23.

By feeding a constant load in this way, it is possible to create an environment for measurement of the maximum transmission delay time etc. of cells.

Figure 12:
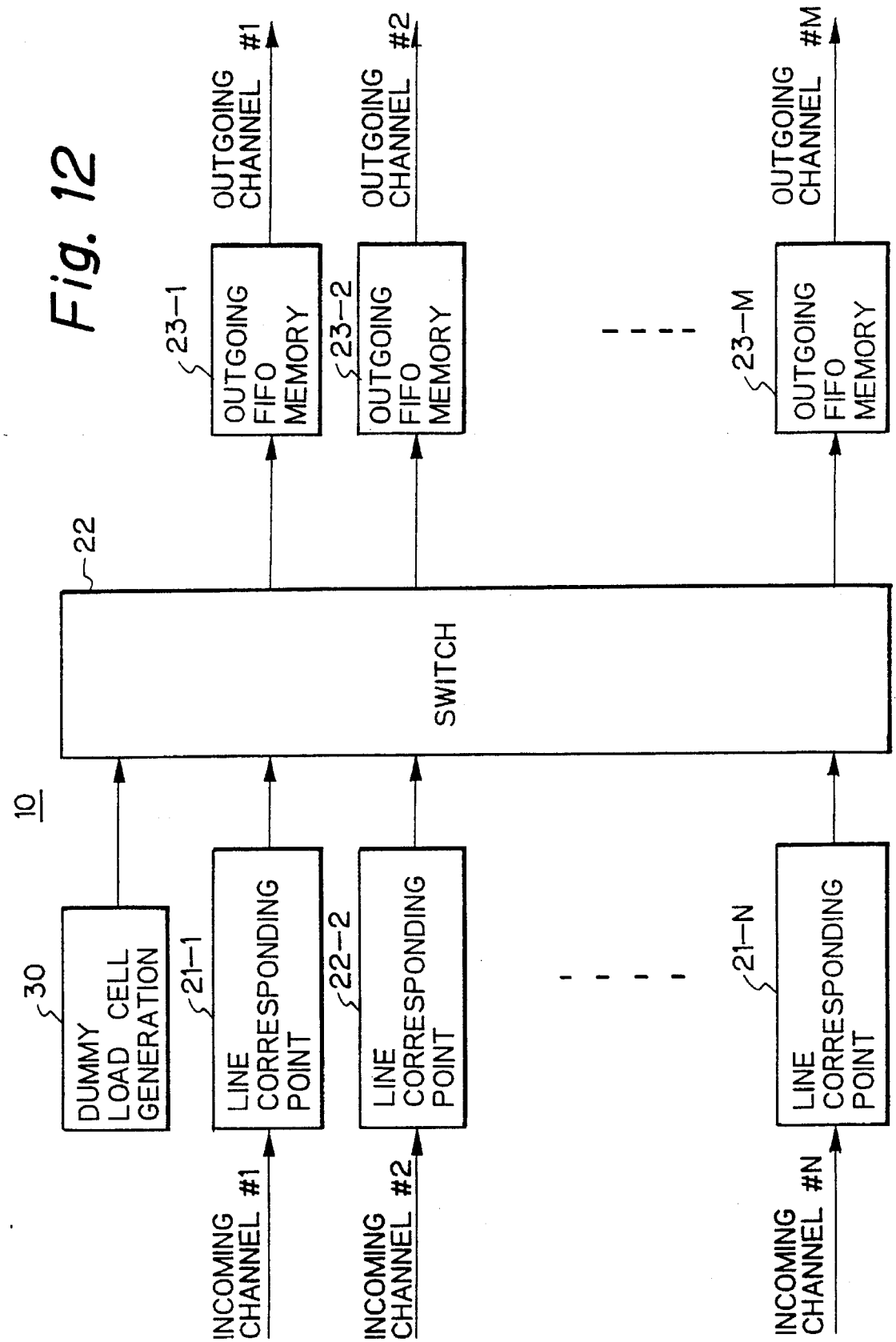
FIG. 12 is a view of a second embodiment based on the present invention.

FIG. 12 is a view of a second embodiment based on the present invention. In this second embodiment, the dummy load cell generating means 30 are provided at the input side of the switch 22 and write dummy load cells in the outgoing FIFO memories to be tested through the switch 22.

In the figure, the line corresponding points 21-1 to 21-N, the switch 22, and the outgoing FIFO memories 23-1 to 23-N are the same as those shown in the prior art example. The point of difference is the provision of the dummy load cell generating means 30 at the input side of the switch 22. The dummy load cells generated at the dummy load cell generating means 30 (for example, empty cells) are made possible to be input through the switch 22 to the outgoing FIFO memories 23 tested.

By constructing the system in this way, at the time of a general load feeding test, dummy cells directed to the outgoing FIFO memories 23 tested are generated by the dummy load cell generating means 30 at cell generation intervals based on a Poisson distribution or exponential distribution and are input through the switch 22 to the outgoing FIFO memories 23 tested by the load test.

Further, at the time of a constant load feeding test, the number of accumulated cells of the outgoing FIFO memories 23 to be tested is monitored, dummy cells are generated by the dummy load cell generating means 30 so as to give a fixed number of accumulated cells., and these are input through the switch 22 to the outgoing FIFO memories 23.

Figure 13:
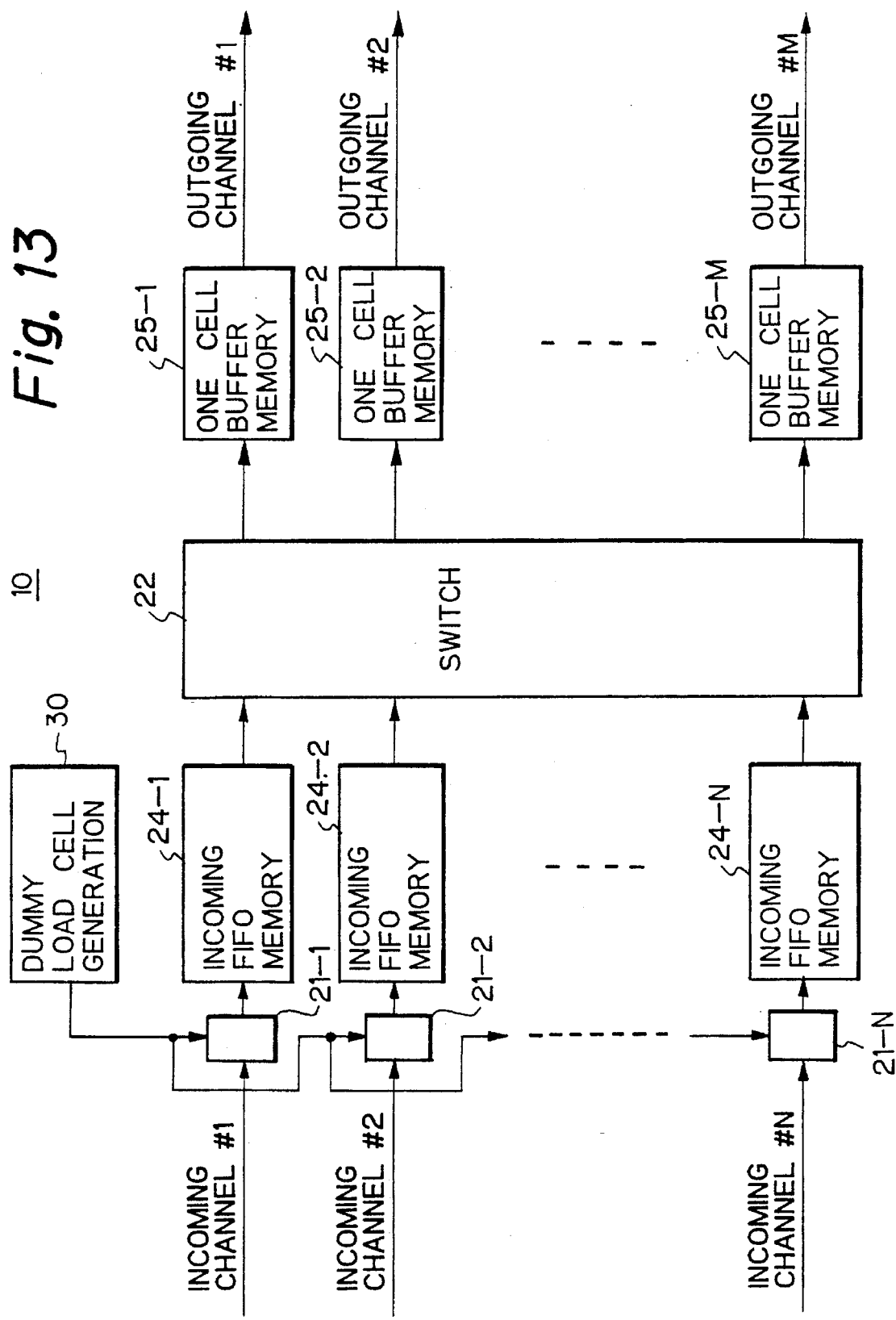
FIG. 13 is a view of a modification of the second embodiment.

FIG. 13 is a view of a modification of the second embodiment. According to the construction of FIG. 12, the switch 22 is provided with line corresponding points 24 which convert the virtual channel numbers (VCN) and produce the TAG's for each channel at the incoming side. The dummy load cell generating means 30 are comprised of empty cell generating units 31 and TAG adding units which attach TAG's produced in the same way as in the line corresponding points 24 to the empty cells output from the empty cell generating units 31.

On the other hand, according to the construction of this figure (FIG. 13), the dummy load cell generating means 30 are paired with the line corresponding points 24 and selectors 62 which select one of the ordinary ATM cells or the said empty cells are provided at the inputs of the line corresponding points.

Figure 14:
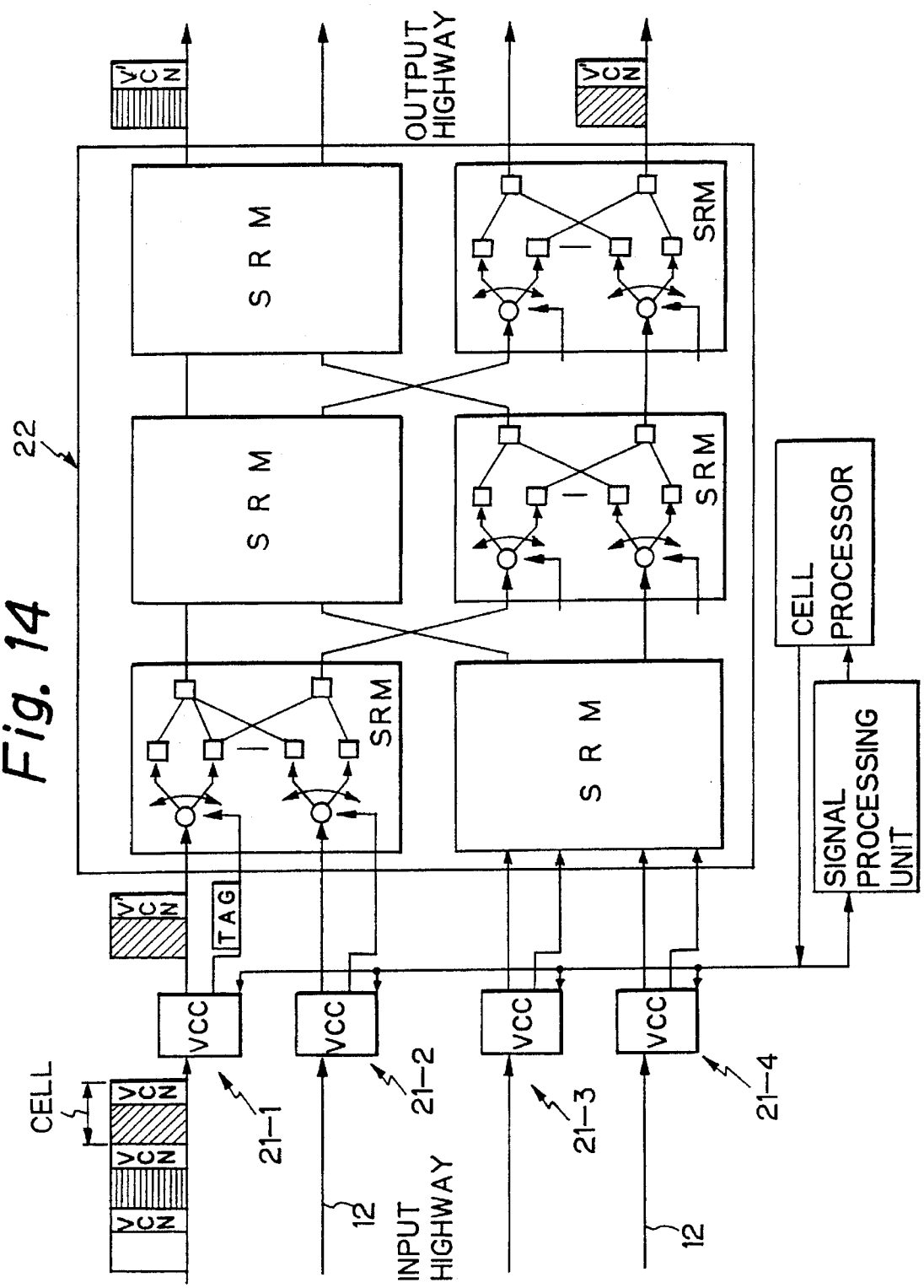
FIG. 14 is a view schematically showing the constitutions of a general line corresponding point and switch.

FIG. 14 is a view schematically showing the constitutions of a general line corresponding unit and switch. It shows, however, a type of ATM cross connection having outgoing FIFO memories. In the figure, VCC indicates a VCN converter and is the biggest portion in terms of the line corresponding points.

Further, the switch 22 is comprised of self routing modules (SRM) of multistage tandem connections.

Both the dummy load cell generating means 30 of FIG. 12 and the dummy load cell generating means 30 of FIG. 13 are mainly comprised of empty cell generating units 31 and TAG adding units having a similar construction as the above-mentioned line corresponding point (VCC).

Figure 15:
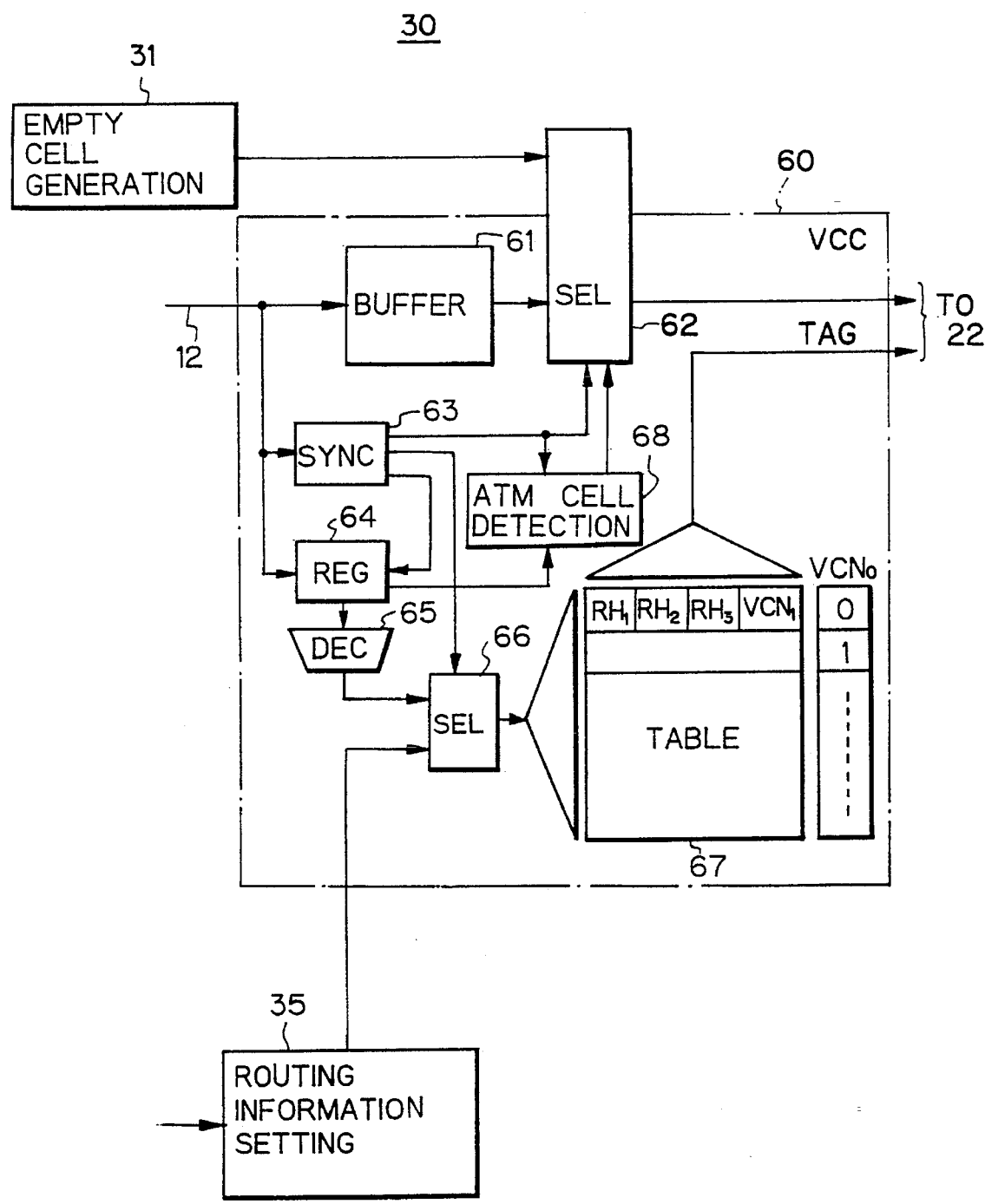
FIG. 15 is a view of a detailed example of the dummy load cell generating means shown in FIG. 13.

FIG. 15 is a view of a detailed example of the dummy load cell generating means shown in FIG. 13. However, the dummy load cell generating means shown in FIG. 12 has substantially the same construction as that in FIG. 15. The above-mentioned TAG adding unit is shown as the TAG adding unit 60 in FIG. 15. Here, ordinary ATM cells are input and are branched into two, with one being applied to the buffer 61 and the other being applied to a cell synchronization circuit (SYNC) 63 and register (REG) 64. The cell synchronization circuit 63 uses the HEC in the ATM header to produce a synchronous timing signal and applies that signal to the circuit blocks. The information signals of the ATM header are temporarily stored in the register 64. The ATM header information signals are converted to ATM header data (VCNo) at a decoder 65 and applied to the Table 16 through the selector (SEL) 66. The VCNo is used as an address and the Table 16 is accessed. The Table 16 outputs the header information (VCN1) and the routing header information (RH) of the cell of the next link and adds the same as a TAG to the cells from the selector (SEL) 62. This selector is the previously mentioned selector 62. The selector 62 selects the ATM cells from the buffer 61 at usual times and selects empty cells from the empty cell generating unit 31 at the time of ATM tests and sends the same to the switch 22 side.

When usual ATM cells are input, it is not allowed to simultaneously generate empty cells for test purposes. Therefore, the input of the selector 62 is switched to the dummy load cell generating means 30 side only when it is detected by the ATM cell detection unit 68 that no empty cells are included in the ordinary ATM cells.

The empty cell generating unit 31 included in the dummy load cell generating means 30 shown in FIG. 12 and FIG. 13 has exactly the same construction as explained with reference to FIG. 9. That is, the empty cell generating unit 31 is comprised of flip-flops 42 corresponding to the plurality of octets constituting the ATM header portions of the ATM cells; a data selector 41 which selects the bits of the octets and outputs the word data; a counter 43 which selects the bit data in the data selector in the order of the octets; a payload pattern generator 44 which generates any data pattern to be written in the payloads of the ATM cells; and a multiplexer 45 which combines the outputs from the data selector 41 and the output from the pattern generator 44.

For the test method, in FIG. 13. at the time of a general load test, dummy load cells generated by the dummy load cell generating means 30 at a predetermined distribution of probability of occurrence are input to the incoming FIFO memories 24 being tested to perform the load test. Alternatively, at the time of a constant load test, the number of cells accumulated in the incoming FIFO memories 24 being tested is monitored and dummy load cells are generated by the dummy load cell generating means 30 to make the same a constant value and are input to the incoming FIFO memory 24 being tested to perform a constant load test. The number of cells accumulated may be monitored using the cell number monitoring means 50 (FIG. 11).

Figure 16:
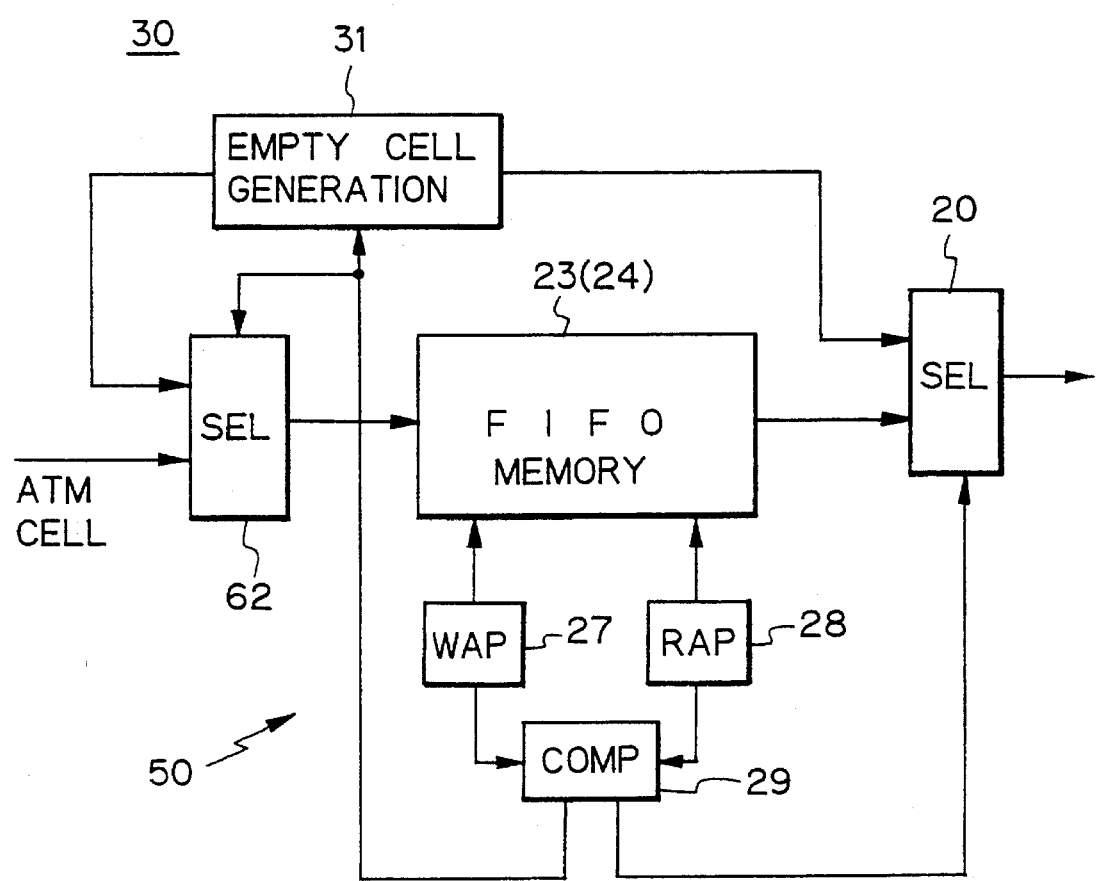
FIG. 16 is a view of an example of the constitution of the cell number monitoring means.

FIG. 16 is a view of an example of the constitution of the cell number monitoring means. The cell number monitoring means 50 is provided at the incoming or outgoing FIFO memories and triggers the dummy load cell generating means 30 each time the number of cells in the FIFO memories falls below a predetermined constant value, whereby a load test may be performed under conditions wherein a constant amount of cells is accumulated in the FIFO memories. In FIG. 16, the cell number monitoring means 50 is mainly comprised of a comparator (COMP) 29 which compares the point values of the write address pointers (WAP) 27 and read address pointers (RAP) 28 constituting part of the FIFO memories (23, 24) and, when the difference between those values falls below the constant value, outputs to the dummy load cell generating means 30 a write indication signal for the FIFO memories. The write indication signal from the comparator 29 is applied to the selector 62 as well. At this time, the selector 62 selects the empty cells from the empty cell generating unit 31 and gives them to the FIFO memories. Note that the signal line from the comparator 29 to the selector (SEL) 20 and the signal line from the empty cell generating unit 31 to the selector 20 originally constitute part of the FIFO memories. When the number of points of the read address point becomes larger than the number of points of the write address pointer, empty cells are sent from the selector 20. Note that empty cells are necessary for maintaining synchronization at the receiver side.

FIG. 17 is a view of a third embodiment based on the present invention. In working the present invention, various modifications are possible in addition to the first and second embodiments explained above. For example, in the case of the ATM cross connection processing unit of the incoming FIFO type (FIG. 4), in the embodiments explained above, a dummy load cell generating means 30 was provided at the input side of the switch 22 to make a load feeding state, but it is also possible to artificially generate a control signal to make it look like cells are always accumulated in the buffer memories 25 at the output side of the switch 22 (or reading of data from the buffer memories 25 may be prohibited to ensure data is actually accumulated there) and thereby prohibit the input of cells to the buffer memories 25, whereby cells directed to the buffer memories 25 are continuously input to the incoming FIFO memories 24 being tested and are accumulated in the same for the load feeding test.

That is, the ATM cross connection processing unit 10 has incoming FIFO memories 24 at the incoming side of the switch and has buffer memories 25 at the outgoing side, and the dummy load cell generating means 30' generate control signals C equivalent to signals showing cells accumulating in the buffer memories 25 and apply the same to the incoming FIFO memories 24.

The incoming FIFO memories 24 are switched to a first-in last-out operation when receiving the control signals C. That is, by outputting the quickly received cells at a delayed timing, it appears as if a large number of cells fill the incoming FIFO memories 24 (overload).

The above explanation was made for an embodiment based on the ATM cross connection of the type of FIG. 3 or FIG. 4, but it is also possible to perform a load feeding test for a bus matrix type (FIG. 5) ATM cross connection processing unit by applying the dummy load cells generated by the dummy load cell generating means to the incoming or outgoing FIFO memories (23, 24).

As explained above, according to the present invention, it is possible to simply perform load tests and other ATM tests with a small sized apparatus. In particular, according to the present invention, load feeding tests and other system tests may be performed without special measuring equipment even in the transitional period before the spread of the ATM system when dedicated measuring equipment is still not available.

We claim:

1. An asynchronous transfer mode (ATM) multiplex transmission system, comprising:

an ATM adaptation layer (AAL) processing unit which receives data from terminal equipment, assembles data to be transmitted into ATM cells and multiplexes the ATM cells, and which demultiplexes multiplexed ATM cells sent to the terminal equipment and distributes the data to the terminal equipment;

an ATM cross connection processing unit having a switch which switches multiplexed ATM cells received from the AAL processing unit to outgoing channels, or which switches the multiplexed ATM cells received from the incoming channels to the AAL processing unit, the incoming first-in first-out (FIFO) memories connected between the incoming channels and the AAL processing unit, and the outgoing FIFO memories connected between the outgoing channels and the AAL processing unit; and dummy load cell generating means for forcibly writing dummy load cells in the incoming FIFO memories or outgoing FIFO memories in the ATM cross connection processing unit for testing at least one route and the dummy load cell generating means connected to at least a selector for selectively inputting either the ATM cells or the dummy load cells to said FIFO memories, wherein each dummy load cell has header information for a virtual channel identifier and a virtual path identifier specifying the routes to be tested.

2. A system as set forth in claim 1, wherein said dummy load cell generating means are provided corresponding to the outgoing FIFO memories, and wherein outputs of the dummy load cell generating means are connected to the inputs of the outgoing FIFO memories.

3. A system as set forth in claim 2, wherein said dummy load cell generating means comprises empty cell generating units generating and transmitting empty cells to outgoing FIFO memories and to the outgoing channels.

4. A system as set forth in claim 3, wherein each of said empty cell generating units comprises:

flip-flops, corresponding to a plurality of octets comprising ATM header portions of the ATM cells;

data registers, which select bits of the octets and output word data;

a counter, which selects bit data in data selectors in the order of the octets;

a pattern generator, which generates any data pattern to be written in the payloads of the ATM cells; and a multiplexer, which combines the outputs from the data selectors and the output from the pattern generator.

5. A system as set forth in claim 1, wherein said dummy load cell generating means connects to the input side of the switch, and writes dummy load cells in the outgoing FIFO memories to be tested through the switch.

6. A system as set forth in claim 5, wherein said switch is connected to line corresponding points, which convert a virtual channel number (VCN) NO and produce TAGS; and said dummy load cell generating means comprises empty cell generating units which generate empty cells, and TAG adding units which attach the TAGS to the empty cells output from the empty cell generating units.

7. A system as set forth in claim 6, wherein said dummy load cell generating units are paired with said line corresponding points and wherein said dummy cell generating means is connected to selectors, each of said selectors selects one of the ATM cells received from the ATM adaptation layer processing unit or said empty cells received from said empty cell generating units, and wherein said dummy load cell generating units are provided at the input of the line corresponding points.

8. A system as set forth in claim 5, wherein each of said empty cell generating units comprises:

flip-flops corresponding to the plurality of octets constituting ATM header portions of the ATM cells;

data selectors, which select bits of the octets and output word data;

a counter, which selects the bit data in data selectors in the order of the octets;

a pattern generator, which generates any data pattern to be written in the payload of the ATM cells; and a multiplexer, which combines the outputs from the data selectors and the output from the payload pattern generator.

9. A system as set forth in claim 1, wherein said ATM cross connection processing unit has the incoming FIFO memories and has buffer memories which are connected to the switch, and wherein the dummy load cell generating means generates control signals indicating cells accumulating in the memories and applies the control signals to line corresponding points which are connected to the switch.

10. A system as set forth in claim 9, wherein said incoming FIFO memories are switched to first-in last-out operation, when receiving said control signals.

11. A system as set forth in claim 1, further comprising cell number monitoring means connected to at least one of incoming and outgoing FIFO memories and actuates the dummy load cell generating means each time the number of cells in at least one of the incoming or outgoing FIFO memories falls below a predetermined fixed value, where a load test is performed under conditions wherein a fixed amount of cells are kept in at least one of the incoming and outgoing FIFO memories.

12. A system as set forth in claim 11, wherein said cell number monitoring means comprises a comparator, which compares point values of write address pointers and read address pointers constituting part of the FIFO memories and, when the difference between the point values falls below said fixed value, outputs to the dummy load cell generating means signal instructing writing of empty cells in at least one of the FIFO memories.

13. A system as set forth in claim 1, wherein said dummy load cell generating means cooperates with a function generator and outputs cells in accordance with the function generated by the function generator.

14. A system as set forth in claim 13, wherein said function generator generates function approximating one of a Poisson distribution and a Gaussian distribution.

15. An asynchronous transfer mode (ATM) multiplex transmission system having test equipment, comprising:

an ATM adaptation layer (AAL) processing unit receiving data from at least one terminal, assembling data to be transmitted in ATM cells and multiplexing the ATM cells, and the AAL processing unit demultiplexing multiplexed ATM cells transmitted to at least one terminal and distributing data to the at least one terminal;

an ATM cross connection processing unit, having a switch which switches multiplexed ATM cells received from the AAL processing unit to designated lines, receives ATM cells from the designated lines and transmits the ATM cells to the AAL processing unit, wherein the switch switches between incoming channels and outgoing channels, the incoming channels connected to the switch by way of incoming first-in first-out (FIFO) memories and the outgoing channels connected to the switch by way of outgoing FIFO memories, which are respectfully provided at the incoming or outgoing sides of said switch; and dummy load cells generating means for forcible writing dummy load cells in the incoming FIFO memories or outgoing FIFO memories in the ATM cross connection processing unit for testing at least one route, wherein each dummy load cell has header information for a virtual channel identifier and a virtual path identifier specifying the routes to be tested.

16. A transmission system, connected to a cell processing unit which assembles information received from a terminal into a fixed length cell with a header for routing control, for switching the cell based on the header, comprising:

a switch for switching a received cell from the cell processing unit to an outgoing line designated by the header of the received cell;

an outgoing first-in first-out memory, provided between the switch and the outgoing line, for temporarily storing the received cell and for outputting the received cell to the outgoing line; and a dummy load cell generator for generating a dummy load cell and for writing the dummy load cell into the outgoing first-in first out memory to put a certain load on the outgoing first-in first-out memory.

17. A transmission system, connected to a cell processing unit which assembles information received from a terminal into a fixed length cell with a header for routing control, for switching the cell based on the header, comprising:

an incoming first-in first-out memory, for temporarily storing a received cell from the cell processing unit;

a switch, provided between the incoming first-in first-out memory and an outgoing line, for switching the received cell from the incoming first-in first-out memory to an outgoing line designated by the header of the received cell; and a dummy load cell generator for generating a dummy load cell and for writing the dummy load cell into the incoming first-in first-out memory to put a certain load on the incoming first-in first-out memory.

18. A transmission system, connected to a cell processing unit which assembles information received from a terminal into a fixed length cell with a header for routing control, for switching the cell based on the header, comprising:

a switch for switching a received cell from the cell processing unit to an outgoing line designated by the header of the received cell;

an outgoing memory, provided between the switch and the outgoing line, for temporarily storing the received cell and for outputting the received cell to the outgoing line; and a dummy load cell generator for generating a dummy load cell and for writing the dummy load cell into the outgoing memory to put a certain load on the outgoing memory, said dummy load cell generator connects to the input side of the switch and write dummy load cells in the outgoing memory to be tested through the switch.

* * * * *